United States Patent [19]

Mori

[11] 4,422,178
[45] Dec. 20, 1983

[54] RADIO COMMUNICATION RECEIVER HAVING AN OSCILLATOR CIRCUIT OF LOWER POWER-CONSUMPTION

[75] Inventor: Toshihiro Mori, Tokyo, Japan

[73] Assignee: Nippon Electric Co., Ltd., Tokyo, Japan

[21] Appl. No.: 336,988

[22] Filed: Jan. 4, 1982

[30] Foreign Application Priority Data

Jan. 20, 1981 [JP] Japan ................. 56-6292[U]

[51] Int. Cl.³ .............................................. H04B 1/16
[52] U.S. Cl. .................................. 455/343; 455/228; 340/825.44
[58] Field of Search ...................... 455/227, 228, 343; 340/825.44; 307/64, 66; 331/185, 186

[56] References Cited

U.S. PATENT DOCUMENTS

| | | | |
|---|---|---|---|
| 3,996,581 | 12/1976 | Brodeur et al. | 455/343 |
| 4,195,263 | 3/1980 | Masaki et al. | 455/343 |
| 4,380,832 | 4/1983 | Nagata et al. | 455/343 |

FOREIGN PATENT DOCUMENTS

| | | | |
|---|---|---|---|
| 54-48412 | 4/1979 | Japan | 455/343 |
| 54-104704 | 8/1979 | Japan | 455/343 |
| 2061066 | 5/1981 | United Kingdom. | |
| 2061067 | 5/1981 | United Kingdom. | |
| 2062320 | 5/1981 | United Kingdom. | |

*Primary Examiner*—Jin F. Ng
*Attorney, Agent, or Firm*—Sughrue, Mion, Zinn, Macpeak & Seas

[57] ABSTRACT

A radio paging receiver having two power sources, a receiver, a decoder and an oscillator, provides power from the lower of the two voltage sources to the oscillator when the paging receiver is turned off and provides power from the higher of the two voltage sources to the oscillator when the paging receiver is turned on. The oscillator provides higher power pulses to the decoder immediately upon the turn on of the pager thereby providing an immediate normal tone sound from the paging receiver.

7 Claims, 2 Drawing Figures

RADIO COMMUNICATION RECEIVER HAVING AN OSCILLATOR CIRCUIT OF LOWER POWER-CONSUMPTION

BACKGROUND OF THE INVENTION

The present invention relates a radio paging receiver and, more particularly to a paging receiver having an oscillator circuit of low power consumption.

A paging receiver such as the one disclosed in the U.S. Pat. Nos. 4,181,893 or 4,160,240 is required to have low power consumption as well as a small size and multiple or complicated functions (for example, display, alert and battery saving functions). To meet this requirement, a most recently developed pager such as the one disclosed in the U.S. Pat. No. 4,196,310 is equipped with a microprocessor, which permits various complicated functions and flexibility.

Such pagers require a variety of timing signals to provide the desired multiple functions.

While these signals are produced by frequency-dividing the output of an oscillator having a frequency in the order of tens of KHz, the alert tone is also produced by the same process. If a quartz oscillator at a frequency around 30 KHz is used for this purpose, it takes a long time, say several seconds, to reach a stable state after switch-on, because of its high equivalent resistance. This presents a problem in connection with the testing function of a radio paging receiver, such as a pocket bell as it is called in Japan. Depression of the switch for testing will not immediately result in the alert tone sounding, thus failing to indicate that the receiver is ready. Therefore, with this type of paging receivers wherein power is not supplied to its oscillator until its power switch is turned on the user must be informed before hand that there is a time lag in the response to testing.

Furthermore, even after oscillation is started, the sound produced is not normal and in some cases is offensive to the ear until the oscillation frequency is stabilized.

To overcome this problem, a proposal has been made in U.S. Pat. No. 4,195,263 assigned to the same assignee as the present application. In the receiver disclosed in the referenced patent, the battery is directly connected to the oscillator circuit, which accordingly always stays on. This makes it possible for the receiver to produce a normal frequency tone in response to the power switch for the whole of the receiver being turned on.

However, the teaching of this prior art is only applicable to the situation where no more than one power source is used.

Generally, a receiver to be equipped with a CMOS microprocessor or circuit requires a 3-volt (3 V) power source for operation, in addition to a one-volt (1 V) power source for the aforementioned purpose of keeping the oscillator circuit alive. In other words, at least two power sources are needed for such a paging receiver. As a result, the teaching of the above-referenced patent is not directly applicable to a paging receiver of this type.

SUMMARY OF THE INVENTION

One object of the present invention is therefore to provide a radio paging receiver having two or more power sources and being capable of starting regular receiving operation and sounding an alert tone at a normal frequency immediately after the power switch is turned on, and yet consumes relatively little power in the oscillator circuit.

A radio communication receiver of the present invention comprises receiver means for demodulating received signals; decoding means for decoding the demodulated signals; oscillator means connected to the decoder means for generating a reference timing signal; first power source means having first voltage; second power source means having second voltage which is higher than the first voltage; power switch means connected to the first and second power source means; and means provided between the first and second power source means for supplying the first voltage to the oscillator means in response to the turning off of the power switch means and automatically supplying the second voltage to the oscillator means in response to the turning on of the power switch means.

BRIEF DESCRIPTION OF DRAWINGS

Other features and advantages of the invention will be more apparent from the detailed description hereunder taken in conjunction with the accompanying drawings, wherein.

DETAILED DESCRIPTION OF THE INVENTION

Figure 1:
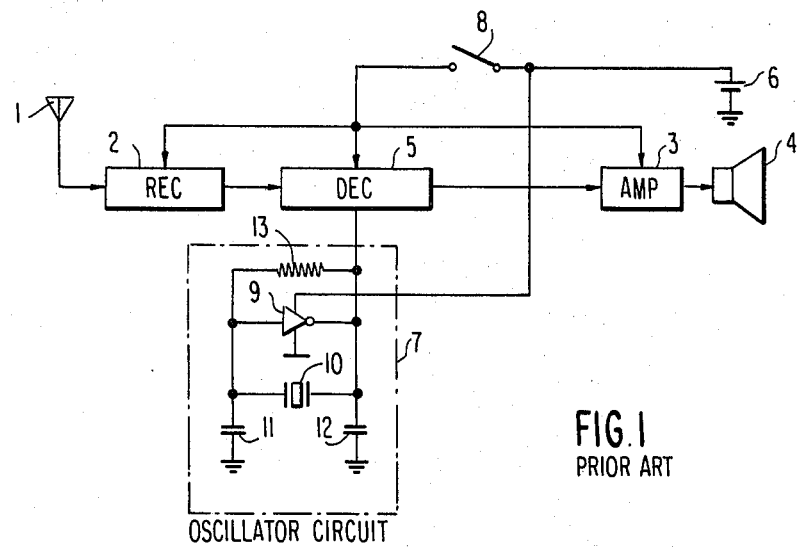
FIG. 1 is a block diagram of the principal part of a conventional radio paging receiver.

Referring to FIG. 1, a receiver section 2 receives a signal picked up by an antenna 1. A decoder 5 determines whether or not the output of the receiver section 2 is the designated signal. If it is, a loudspeaker 4 is driven through an amplifier 3. An oscillator circuit 7, which is connected to a battery 6, supplies a timing pulse to the decoder 5. A power switch 8, which is connected to the battery 6, switches power supply to the receiver section 2, decoder 5 and amplifier 3.

The oscillator circuit 7 consists of an amplifier 9 connected to the battery 6, a crystal (quartz oscillator) 10, capacitors 11 and 12 and a resistor 13.

In such a conventional receiver, power from the battery 6 is supplied to the oscillator circuit 7 without going through the power switch 8 to keep the oscillator circuit always active. As a result, the turning on of the power switch 8 immediately results in an alert tone sounding (response to the testing) at its normal frequency and the start of receiving operation.

However, this is applicable only to a single-cell system, but not directly applicable to a receiver having two or more power sources as stated above. For further details of the conventional receiver, reference is made to the aforementioned U.S. Pat. No. 4,195,263.

Figure 2:
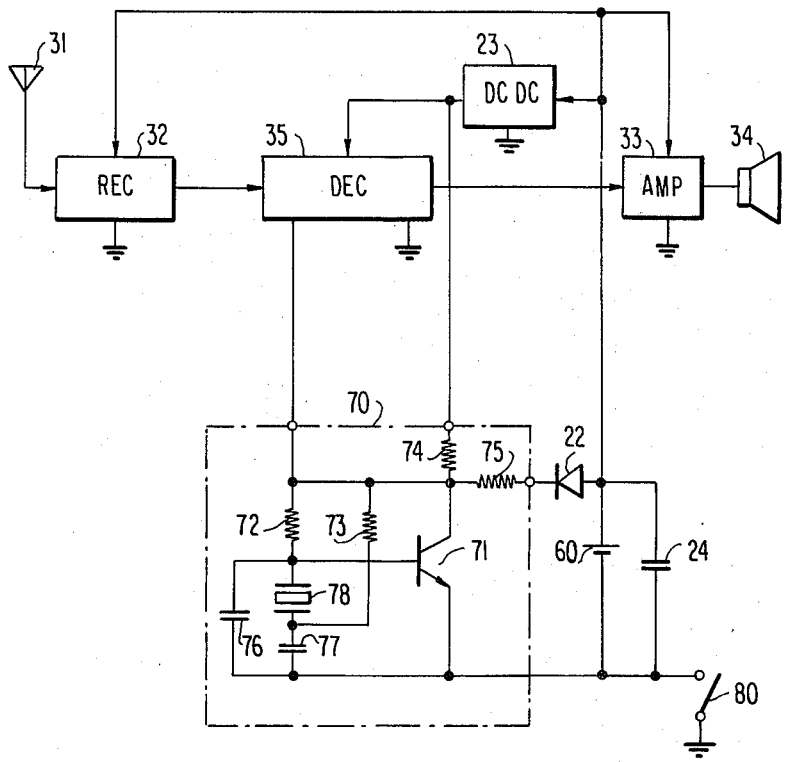
FIG. 2 is a block diagram of the principal part of one embodiment of the radio communication receiver according to the invention.

Referring now to FIG. 2, which is a block diagram of the principal part of the receiver according to the present invention, the output of an antenna 31 is led to a receiver section 32, whose output is led to a decoder 35, whose output is then led to an amplifier (a low-frequency amplifier) 33, whose output is further led to loudspeaker 34. To the decoder 35 is led the output of an oscillator 70, which has a crystal 78, a transistor 71, resistors 72–75 and capacitors 76 and 77, connected as illustrated.

To this resistor 75, in particular, is connected the cathode of a diode 22, to whose anode is connected the positive electrode of a battery 60, and to this positive electrode of the battery 60 is connected a DC-DC converter 23 together with the receiver section 32 and amplifier 33. To the negative electrode of this battery 60 are connected the capacitors 76 and 77 and the emitter of the transistor 71, together with one terminal of a power switch 80. Further in parallel with this battery 60 is connected a capacitor 24.

The other terminal of the power switch 80 is connected to the grounding terminal of the receiver section 32, decoder 35, DC-DC converter 23 and amplifier 33.

Further, the output of the DC-DC converter 23 is led, by way of the decoder 35 and resistor 74, to the collector of the transistor 71.

In this circuit, a signal demodulated by the receiver section 32, for receiving signals picked up by the antenna 31, is fed to the decoder 35, which determines whether or not the input signal is the designated signal. Determining that it is, the decoder 35 activates the amplifier 33, which then drives the speaker 34 to sound an alert tone. The oscillator circuit 70 supplies the decoder 35 with a reference timing signal. By frequency-dividing this reference timing signal, the decoder 35 provides various timing signals needed for the receiving operation and gives the frequency of the alert tone by frequency-dividing the clock signal.

Next will be described the characterizing operation of the present invention. In a radio communication receiver according to the invention, like in a conventional receiver, the oscillator circuit 70 is always kept active even when the power switch 80 is off. In this instance, power from the battery 60 is fed by way of the diode 22 to the oscillator 70. Thus, the power is supplied by way of the resistor 75 to the collector of the transistor 71. The crystal 78, which is connected between the base and emitter of the transistor 71, constantly oscillates on the one-volt power system. As the constant oscillation of this oscillator circuit 70 takes place at 1 V, it consumes little power.

If signal receiving operation is started by turning on the power switch 80 in this state, the negative electrode of the battery 60 will be connected to the ground by way of the power switch 80, so that there will be formed a DC loop consisting of the battery 60, receiver section 32, amplifier 33, DC-DC converter 23, decoder 35 and oscillator circuit 70. At this time, the 1 V power supplied from the battery 60 is boosted to 3 V by the DC-DC converter 23, and the boosted voltage is fed to the decoder 35 and to the collector of the transistor 71 through the resistor 74. Accordingly, clock pulses of approximately 3 V amplitude is supplied from the oscillator circuit 70 to the decoder 35.

Because the oscillator circuit 70 was on even before the power switch 80 is turned on, it shifts to oscillating operation on the 3 V volts from the DC-DC converter 23 as soon as the power switch 80 is turned on. Thus, as the oscillator circuit 70 has already been active at 1 V, its shift to 3 V is achieved instantaneously to permit immediate start of normal receiving operation by the receiver at its regular oscillating frequency. Further, the turning on of the power switch 80 results immediately in an alert tone sounding at the normal frequency. At this time, the current flowing from the 1 V power source to the oscillator circuit 70 is only in the order of several microamperes, which is far smaller than the operating current (for example, 4–6 milliamperes) of the receiver and accordingly too small to substantially affect the life of the battery.

So that the current from the 3 V power source may not flow into the battery 60 which is the 1 V power supply source, there is provided the diode 22. Conversely, to prevent current leakage from the 1 V power source to the 3 V power source when the former alone is at work, another diode may be inserted into the input from the 3 V power source to the oscillator circuit 70. If the polarity of the power source is changed, the direction of the diode 22 will be reversed.

With respect to the decoders using a microcomputer or central processing unit, reference is made to the U.K. Patent Published Application Nos. GB 2,061,066A; 2,061,067A and 2,062,320A.

As hitherto described, according to the present invention, the oscillator circuit of a radio communication receiver having two or more power sources is oscillating even when the power switch is off, so that an alert tone can be generated upon turning on of the power switch and, moreover, the alert tone so generated is a normal sound, instead of a noise offensive to the user's ear, because its oscillating frequency is the normal stabilized frequency. A prompt shift to proper receiving operation is also ensured thereby. The invention further has the additional advantage of dispensing with a power amplifier for voltage conversion, which would otherwise be required between the oscillating circuit and the decoder.

What is claimed is:

1. A radio communication receiver comprising receiver means for demodulating received signals; decoding means for decoding the demodulated signals; oscillator means connected to said decoder means for generating a reference timing signal; first power source means having first voltage; second power source means having second voltage which is higher than said first voltage; power switch means connected to said first and second power source means; and means connected between said first and second power source means for supplying said first voltage to said oscillator means in response to the turning-off of said power switch means and supplying said second voltage to said oscillator means in response to the turning-on of said power switch means.

2. A radio communication receiver, as claimed in claim 1, wherein said means for supplying comprises at least a diode connected between the output of said first power source means and the output of said second power source means.

3. A radio communication receiver, as claimed in claim 2, where said first power source means is a battery and said second power source means is voltage converter means for converting said first voltage into said second voltage.

4. A radio communication receiver, as claimed in claim 1, wherein said decoder means is a CMOS circuit.

5. A radio communication receiver, as claimed in claim 1, wherein said oscillator means is a crystal oscillator circuit.

6. A radio communication receiver as claimed in claim 3 wherein said receiver means, said decoding means, and said voltage converter means have a common ground, and said power switch has one end connected to one side of said battery and the other side connected to said common ground wherein said receiver means, said decoder means and said voltage converter means are not energized unitl said power switch is closed.

7. A radio communication receiver as claimed in claim 6 wherein said oscillator is a crystal oscillator, first oscillator input circuit connecting said battery to said oscillator, and second oscillator input circuit connecting said voltage converter to said oscillator.

* * * * *